Tipotsch

[15] 3,637,311
[45] Jan. 25, 1972

[54] OPTICAL DICHROISM MEASURING APPARATUS AND METHOD

[72] Inventor: Donald G. Tipotsch, Sunnyvale, Calif.
[73] Assignee: Durrum Instrument Corporation, Palo Alto, Calif.
[22] Filed: Oct. 30, 1967
[21] Appl. No.: 679,064

[52] U.S. Cl. .................................. 356/114, 250/225, 350/159
[51] Int. Cl. ................................................................G01n 21/40
[58] Field of Search ..................356/97, 114, 115, 116, 117, 356/119; 350/154, 159; 250/225

[56] References Cited

UNITED STATES PATENTS

| | | |
|---|---|---|
| 3,540,827 | 11/1970 | Badoz et al. .......................... 350/149 |
| 3,041,921 | 7/1962 | Pickels et al. ......................... 250/225 |
| 3,230,820 | 1/1966 | Wisnieff ................................ 356/117 |
| 2,976,764 | 3/1961 | Hyde et al. ............................ 356/116 |
| 3,164,662 | 1/1965 | Grosjean et al. ...................... 356/97 |
| 3,257,894 | 6/1966 | Grosjean .............................. 356/117 |
| 3,312,141 | 4/1967 | Cary ..................................... 356/117 |
| 3,450,478 | 6/1969 | Sebestyen ............................. 356/117 |

FOREIGN PATENTS OR APPLICATIONS

| | | |
|---|---|---|
| 1,078,784 | 0/1960 | Germany .............................. 356/117 |
| 753,840 | 3/1967 | Canada ................................. 356/116 |
| 1,129,940 | 10/1968 | Great Britain ........................ 356/114 |

*Primary Examiner*—Ronald L. Wibert
*Assistant Examiner*—J. Rothenberg
*Attorney*—Flehr, Hohbach, Test, Albritton & Herbert

[57] ABSTRACT

An apparatus and method in which a periodic right and left circularly polarized light beam is projected through a sample in which there are included means for occluding the intensity of said right and left circularly polarized light to form a transmitted light beam having right and left circularly polarized light of equal intensity, and means for indicating the amount of occlusion.

2 Claims, 5 Drawing Figures

3,637,311

PATENTED JAN 25 1972

INVENTOR.
DONALD G. TIPOTSCH

BY *Fehr, Kohbach, Pest,*
*Albritton & Herbert*

ATTORNEYS 3,637,311

OPTICAL DICHROISM MEASURING APPARATUS AND METHOD

BACKGROUND OF THE INVENTION

This invention relates generally to an optical circular dichroism measuring apparatus and method, and more particularly to an optical circular dichroism measuring apparatus and method for measuring the differential absorption of dichroic materials.

Optical circular dichroism has been measured with visual apparatus in which plane polarized light is passed through the dichroic material which transforms the light into elliptically polarized light. The emergent light is analyzed to measure the ellipticity due to circular dichroism of the material. Apparatus making use of photographic techniques has also been used to measure optical circular dichroism. Measuring optical circular dichroism with the foregoing type of apparatus is tedious and time consuming and, unless extreme care is employed, the results may not have a high degree of accuracy.

In addition, various methods have been proposed for carrying out the measurements by photoelectric means. One of the most successful of such apparatus employs a beam of monochromatic light which passes through a polarizer to provide plane-polarized light. The beam of plane-polarized light is then passed through a quarter-wave plate or Fresnel prism to produce a light beam which is periodically and alternately right and left circularly polarized. The beam is then projected through the dichroic sample and detected by a photoelectric means. In the absence of circular dichroism, the output of the photoelectric means is a DC electric signal. When the sample has some degree of optical circular dichroism, an AC signal is superimposed upon the output DC signal. The amplitude of the AC signal is dependent upon the difference in absorption of the left and right circularly polarized light and is a measure of the optical circular dichroism. The AC wave is separated out and the AC and DC signals are separately amplified and their ratio recorded as the optical circular dichroism of the sample.

A system of this type has several drawbacks: transients either in the light source or electronic system are not treated identically and produce noise above normal detector noise; the amplifiers employed must be linear; the gain of the amplifiers of the two channels should be substantially constant and equal; and the filters which are employed must be matched.

SUMMARY OF THE INVENTION AND OBJECTS

The present invention provides an apparatus for measuring the differential absorption of dichroic material. The apparatus includes means for forming a monochromatic, periodically right and left circularly polarized light beam. The circularly polarized beam is then passed through the material and impinges on a photoelectric transducer which provides an output electrical signal which is proportional to the intensity of the transmitted light. The electrical signal is detected to provide an output signal representative of the difference in absorption to the right and left circularly polarized beam. This signal is used to adjust an occluding means to occlude more or less of the right and left circularly polarized light impinging on the sample to equalize the intensity of the transmitted right and left circularly polarized light. The amount of adjustment of the occluding means is a measure of the differential absorption of the sample.

It is an object of the present invention to provide an improved optical circular dichroism measuring apparatus and method.

It another object of the present invention to provide an optical circular dichroism measuring apparatus which operates on the principle of optical nulling.

It is another object of the present invention to provide an optical circular dichroism measuring apparatus and method which minimizes the effects of transients, nonlinearity and variations in gain of the amplifiers and mismatching of filters.

It is a further object of the present invention provide a system which gives an indication of differential optical density directly.

The foregoing and other objects of the invention will become more clearly apparent from the following description when taken in conjunction with the accompanying drawing.

DESCRIPTION OF THE PREFERRED EMBODIMENTS

Figure 1:
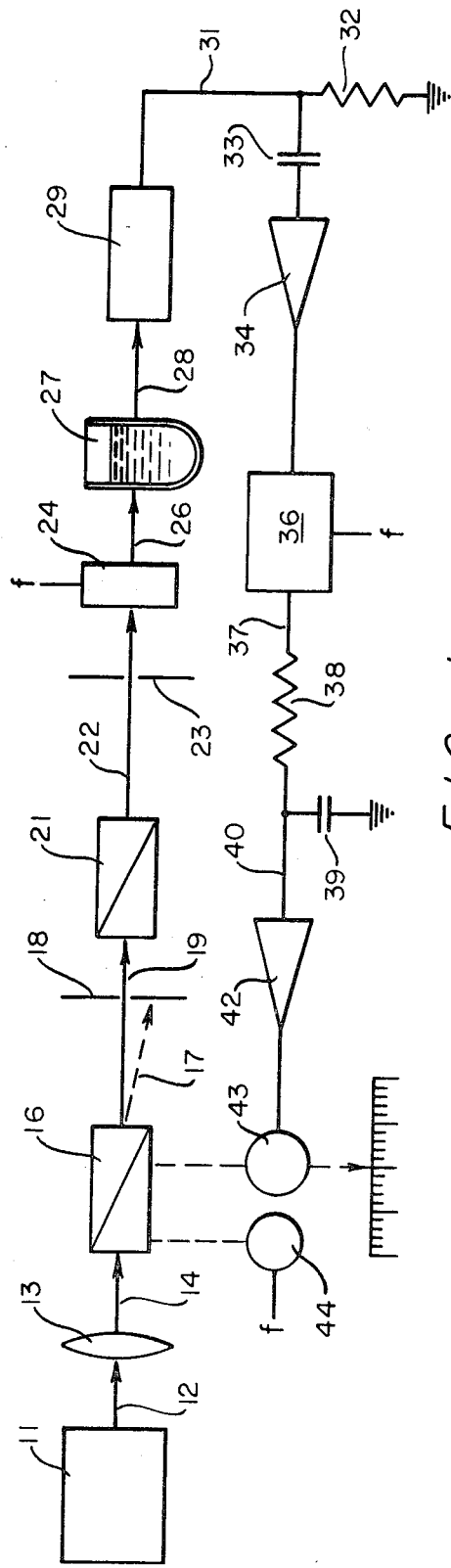
FIG. 1 is a schematic diagram of optical circular dichroism measuring apparatus in accordance with the present invention.

Referring to FIG. 1, a monochrometer 11 produces a monochromatic light beam 12 which is collimated by a lens system 13 to form a monochromatic collimated light beam 14.

The beam 14 is directed through a Rochon polarizer prism 16 which produces two separate beams polarized at right angles. The extraordinary beam 17 is interrupted by a diaphragm 18. The ordinary beam 19 is directed through a second Rochon polarizer prism 21. If the axis of polarization of the two Rochon prisms are identical, then the beam passes through the second polarizer 21 without attenuation. However, if the angles of the polarizers are different, then the beam passes through the second polarizer with a predetermined amount of attenuation.

The emergent beam 22 is projected through a mask 23 to quarter-wave plate 24. The quarter-wave plate may comprise a Pockels cell which is electrically energized with a voltage of predetermined frequency, $f$, and amplitude whereby to alternately and periodically right and left circularly polarize the beam. The frequency of the reversal of polarization and the period of the same is controlled by the signal applied to the Pockels cell. The right and left circularly polarized beam 26 then passes through the sample of dichroic material 27. The emergent beam 28 impinges on a photoresponsive device, such as a photomultiplier 29, which generates an electrical signal which is proportional to light intensity. This signal is available on line 31. In the absence of optical circular dichroism, the right and left circularly polarized light will be equally absorbed and the output signal will be a DC signal. If the sample has optical circular dichroism, the right and left circularly polarized light will be absorbed by different amounts and the output signal will include an AC component having the frequency of the quarter-wave plate excitation signal and an amplitude which is proportional to the difference in absorption of the right and left circularly polarized light by the sample.

The electrical signal on line 31 is capacitively coupled to an AC amplifier by a network including resistor 32 and capacitor 33 which separates the AC and DC components. The AC components are applied to an AC amplifier 34. Any AC amplifier may be employed since the system is not dependent upon the stability, constant gain or linearity of the amplifier for proper operation.

The Rochon prism 16 is oscillated at the fundamental frequency $f$ by vibrating means 44 which serves to oscillate the prism at the fundamental frequency and in synchronism with the operation of the quarter-wave plate. In this manner, light is occluded equally from the right and left circularly polarized beam.

The amplified signal is applied to a synchronous detector 36 which is driven at the fundamental frequency $f$ to detect any AC signal having the fundamental frequency and provide a DC output voltage on the line 37 which is proportional to the amplitude of the signal. The phase sensitive detector may employ a vibrating relay which is driven in phase with the quarter-wave plate excitation signal. The output on line 37 is applied to a resistive-capacitive filter including resistor 38 and capacitor 39. This filter serves to filter out any AC components and provides a DC voltage on line 40. The DC voltage is amplified by a servo amplifier 42 and applied to drive means 43 which may be a servo motor. The servo motor rotates the Rochon prism 16 in a clockwise or counterclockwise direction depending upon the sign of the DC voltage applied thereto. The motive means 44 serves to oscillate the prism at the frequency $f$. Rotation of the prism serves to occlude more light in one circularly polarized phase and less in the other. The prism is rotated until the detected amplified and filtered signal is reduced to zero.

Figure 2:
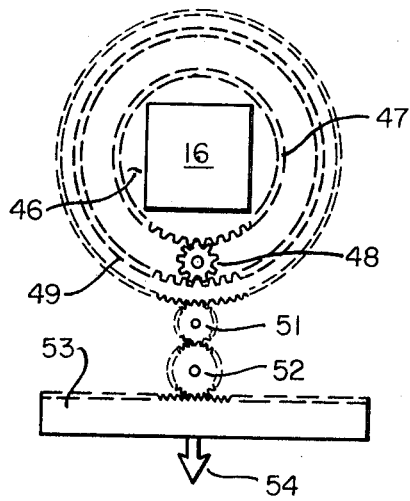
FIG. 2 is a schematic diagram of means for driving the nulling polarizer employed in the system of FIG. 1.

A suitable mounting for the prism 16 is shown in FIG. 2 wherein the prism is mounted in member 46 which includes a spur gear 47 engaged by a pinion 48. The pinion 48 may be oscillated to oscillate the prism 16. In addition, the pinion 48 is engaged by a drive gear 49 which is, in turn, driven by a pinion 51. The pinion may be driven from motor 43. Rotation of the pinion 51 serves to rotate the complete assembly including the pinion 48 and position the axis of the prism. The position of the prism determines the amount of occlusion in the right and left circularly polarized beam. The position of the prism can be indicated by mechanical means such as gear 52 and rack 53 which move a pointer 54. The position of the pointer is an indication of the position of the prism.

The transmission difference (occlusion) of the crossed polarizers is given by $$\text{Cos}^2(\theta-\phi) - \text{Cos}^2(\theta+\phi) = K \sin 2\phi$$

Where $\phi$ is the position angle, and
$\theta$ is the oscillating angle.

The curve $K \sin 2\phi$ closely follows an exponential curve for densities less than 0.1 A., thus the angle $\phi$ can be recorded directly without correction as the differential absorption of the sample.

In operation, the optical elements are aligned without a dichroic material present. Alignment is completed when the output signal from the detector 36 is a DC signal.

The sample material is then introduced. If the sample material has circular dichroism, an AC signal at the fundamental frequency $f$ will appear at the detected 36 and a DC output will appear at 37. The amplified DC energizes the motor 43 which drives the pinion 51 to reposition the Rochon prism 16 until the AC output from the detector is reduced to zero. The position angle $\phi$ gives a direct indication of the differential absorption.

Figure 4:
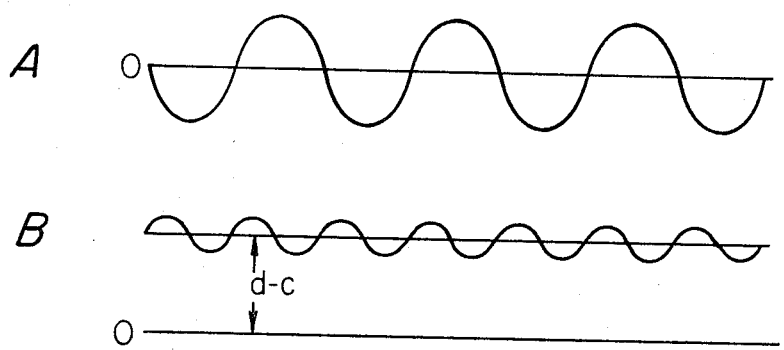
FIG. 4 shows the excitation signal for the quarter-wave plate and the output signal from the photoelectric detector in apparatus of the type shown in FIG. 1.

Referring more particularly to FIG. 4, FIG. 4A shows the AC signal having fundamental frequency $f$ which drives the quarter-wave plate while FIG. 4B shows the output signal appearing on line 31 when the prism 16 is positioned for null. There is a DC component and alternating current components at harmonics of the fundamental frequency. The detector will reject these harmonic signals.

When a Rochon polarizer is used for polarization, it preferably should be one which is made of a material which has no rotary power such as magnesium fluoride or an additional polarizer may be added to compensate for these differences.

The nulling polarizer or nulling element can also comprise a rotating or oscillating neutral density filter phased or positioned to occlude more or less of the right or left circularly polarized light. In this case, the Rochon prism can be quartz since the rotary power does not interfere.

Figure 3:
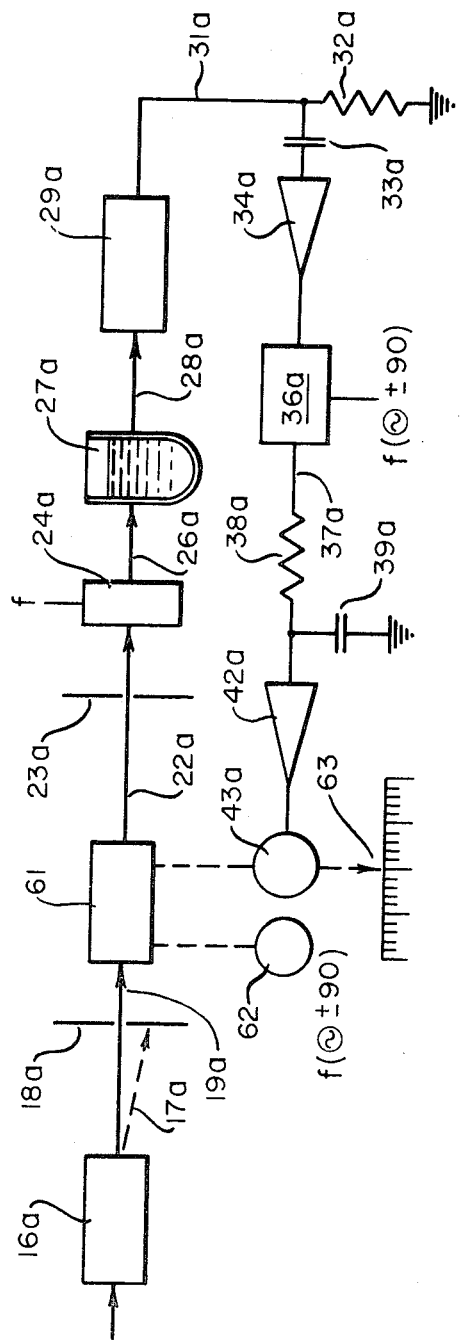
FIG. 3 is a schematic diagram of another embodiment of the invention.

Referring now to FIG. 3, there is shown another embodiment of the present invention. Like reference numerals have been applied to like parts with the addition of the subscripts $a$. A rotating sectored neutral density filter 61 is employed to occlude more or less of the right or left circularly polarized light. The filter is driven by motive means 62 to rotate at the fundamental frequency $f$, however, with a time phase of 90° with respect to the quarter-wave rotary modulator 24$a$ for purposes to be presently described.

Figure 5:
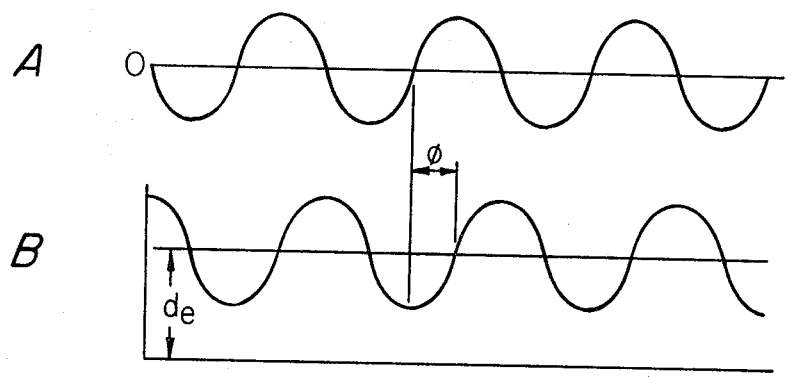
FIG. 5 shows the excitation signal for the quarter-wave plate and the output signal from the photoelectric detector in apparatus of the type illustrated in FIG. 3.

The detector which receives the filtered AC signal is a phase-sensitive detector. The reference signal for the detector has the same phase relationship as the driving signal for the filter 61. The phase-sensitive detector serves to detect any difference in phase between the signal from the amplifier 34$a$ and the signal at reference phase. Any phase difference appears at the output of the detector as a DC signal which is employed to reposition the filter 61. The angular position indicated at 63 is a direct measure of the differential absorption of the sample. FIG. 5A shows the driving voltage, while FIG. 5B shows the output signal on line 31$a$. The phase difference is an indication of the differential absorption.

Thus, there has been provided an optical null system which is insensitive to transients in either the source or electronic system, in which the gain of the amplifier need not be constant and the amplifiers need not be linear.

I claim:
1. Apparatus for measuring the differential absorption of dichroic material which comprises means forming a monochromatic light beam, means including first and second polarizers for receiving said light beam and forming a linearly polarized light beam, means for receiving said linearly polarized light beam and forming at a predetermined frequency a periodically right and left circularly polarized light beam, means for inserting the dichroic material into said circularly polarized light beam, means for receiving the light transmitted by the material and providing an output electrical signal which is proportional to the intensity of the transmitted light, means for detecting the electrical signal and providing a control signal which is proportional to the difference in the intensity of the right and left circularly polarized transmitted light, means for periodically and synchronously oscillating one of said polarizers with respect to the other to periodically occlude the light in the right and left circularly polarized beam at said frequency, means responsive to said control signal for rotating said one of said polarizers with respect to the other to equalize the transmitted right and left circularly polarized light, and means connected to said one polarizer for indicating the amount of rotation.

2. Apparatus for measuring the differential absorption of dichroic material which comprises means forming a monochromatic light beam, means for linearly polarizing said light beam, said linearly polarizing means including first and second polarizers, means for periodically polarizing into right and left circularly polarized light at a predetermined frequency said linearly polarized light beam, means for placing a dichroic material in said circularly polarized light beam, photoelectric means for receiving a light beam transmitted by the material and converting the same into an electrical signal, means for periodically oscillating one of said polarizers with respect to the other to periodically occlude the light in the right and left circularly polarized beam at said frequency, a detector for receiving said electrical signal and providing an output positioning signal which is proportional to the difference in intensity of the right and left circularly polarized light transmitted by the material, means responsive to said positioning signal for adjusting the angular position of said one of said polarizers with respect to the other to transmit more or less light in said right or left circularly polarized beam to maintain the intensity of the light output from said material equal for said left and right circularly polarized light to compensate for the differential absorption of said sample, and means for indicating the angular position of said one polarizer.

* * * * *